(12) United States Patent
Hong

(10) Patent No.: US 9,931,575 B2
(45) Date of Patent: Apr. 3, 2018

(54) DART GAME DEVICE COMPRISING IMAGE-CAPTURE DEVICE FOR CAPTURING IMAGES OF DART GAMES

(71) Applicant: HONG INTERNATIONAL CORP., Seoul (KR)

(72) Inventor: Sang Uk Hong, Seoul (KR)

(73) Assignee: HONG INTERNATIONAL CORP., Seoul (KR)

( * ) Notice: Subject to any disclaimer, the term of this patent is extended or adjusted under 35 U.S.C. 154(b) by 0 days.

(21) Appl. No.: 14/759,347

(22) PCT Filed: Jan. 3, 2014

(86) PCT No.: PCT/KR2014/000042
§ 371 (c)(1),
(2) Date: Jul. 6, 2015

(87) PCT Pub. No.: WO2014/107041
PCT Pub. Date: Jul. 10, 2014

(65) Prior Publication Data
US 2015/0336011 A1     Nov. 26, 2015

(30) Foreign Application Priority Data

Jan. 7, 2013 (KR) .................. 10-2013-0001396

(51) Int. Cl.
*H04N 5/77* (2006.01)
*H04N 9/80* (2006.01)
(Continued)

(52) U.S. Cl.
CPC .......... *A63F 13/86* (2014.09); *A63F 9/0208* (2013.01); *F41J 3/02* (2013.01); *F41J 5/24* (2013.01);
(Continued)

(58) Field of Classification Search
USPC .................. 386/223–224, 239–248, 228
See application file for complete search history.

(56) References Cited

U.S. PATENT DOCUMENTS

| 8,113,930 B1 * | 2/2012 | Coats ............ F41J 3/0019 273/333 |
| 2002/0191952 A1 * | 12/2002 | Fiore ............. H04N 5/76 386/217 |

(Continued)

FOREIGN PATENT DOCUMENTS

| CN | 102549584 A | 7/2012 | |
| DE | 44 29 169 A1 * | 2/1996 | ............ F41J 5/24 |

(Continued)

OTHER PUBLICATIONS

Japanese Office Action dated Aug. 4, 2016, in connection with corresponding JP Application No. 2015-551601 (7 pgs., including English translation).

(Continued)

*Primary Examiner* — Hung Dang
(74) *Attorney, Agent, or Firm* — Maier & Maier, PLLC

(57) ABSTRACT

In order to achieve the object, disclosed is a dart game apparatus for recording a moving picture of a part during a dart game. The dart game apparatus includes: a camera unit for recording the dart game; a touch unit for sensing that a dart game player is ready for throwing a dart; and a controller for controlling the camera unit, wherein the controller allows the camera unit to start recording at the time when the touch unit senses that the dart game player is ready for throwing the dart.

An object of the present invention is to store or transmit only small-capacity data by recording only a part of a dart game or selecting and storing or transmitting only a part of an (Continued)

image of an entire dart game to reduce a burden in storing and transmitting data and remarkably reduce a time for verifying the data.

6 Claims, 17 Drawing Sheets

(51) Int. Cl.
    *A63F 13/86*     (2014.01)
    *A63F 9/02*     (2006.01)
    *H04N 5/91*     (2006.01)
    *G11B 27/031*     (2006.01)
    *F41J 3/02*     (2006.01)
    *F41J 5/24*     (2006.01)

(52) U.S. Cl.
    CPC ............. *G11B 27/031* (2013.01); *H04N 5/91* (2013.01); *A63F 2009/0221* (2013.01)

(56) References Cited

U.S. PATENT DOCUMENTS

| | | | |
|---|---|---|---|
| 2005/0075153 A1* | 4/2005 | Valero Moreno | G07F 17/32 463/1 |
| 2012/0242043 A1 | 9/2012 | Hong | |
| 2012/0251079 A1* | 10/2012 | Meschter | G06F 19/3406 386/278 |

FOREIGN PATENT DOCUMENTS

| | | | | |
|---|---|---|---|---|
| EP | 2472466 A2 | | 7/2012 | |
| GB | 2314513 A | * | 1/1998 | ................. F41J 3/02 |
| JP | 2006-212224 A | | 8/2006 | |
| JP | 2006-255380 | * | 9/2006 | ............... A63F 9/02 |
| KR | 10-2004-0078981 A | | 9/2004 | |
| KR | 10-2007-0062658 A | | 6/2007 | |
| KR | 10-2011-0021069 A | | 3/2011 | |
| KR | 10-2011-0125459 A | | 11/2011 | |
| KR | 10-2011-0021069 | | 10/2013 | |
| WO | 2005006266 A2 | | 1/2005 | |
| WO | WO 2007/098537 A1 | * | 9/2007 | ......... A63B 24/0003 |

OTHER PUBLICATIONS

Chinese Office Action dated Oct. 25, 2016, in connection with corresponding CN Application No. 2011480004155.0 (8 pgs., only English translation provided).

Supplemental European Search Report dated Nov. 2, 2016 of corresponding European application No. 14735272.8; 9 pages.

International Search Report dated Mar. 20, 2014 from corresponding International Application No. PCT/KR2014/000042; 4 pgs.

* cited by examiner

[Fig. 1]
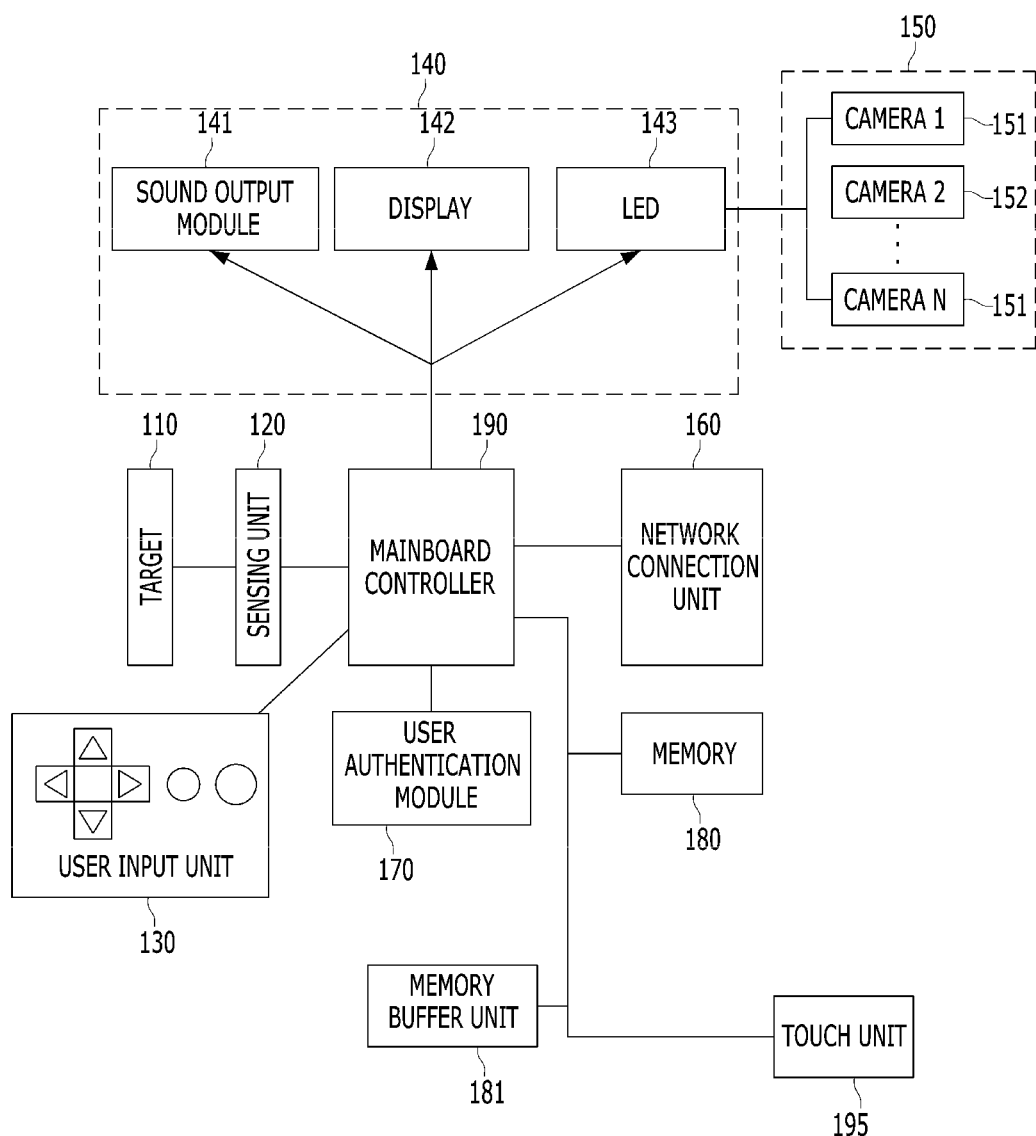

[Fig. 2]
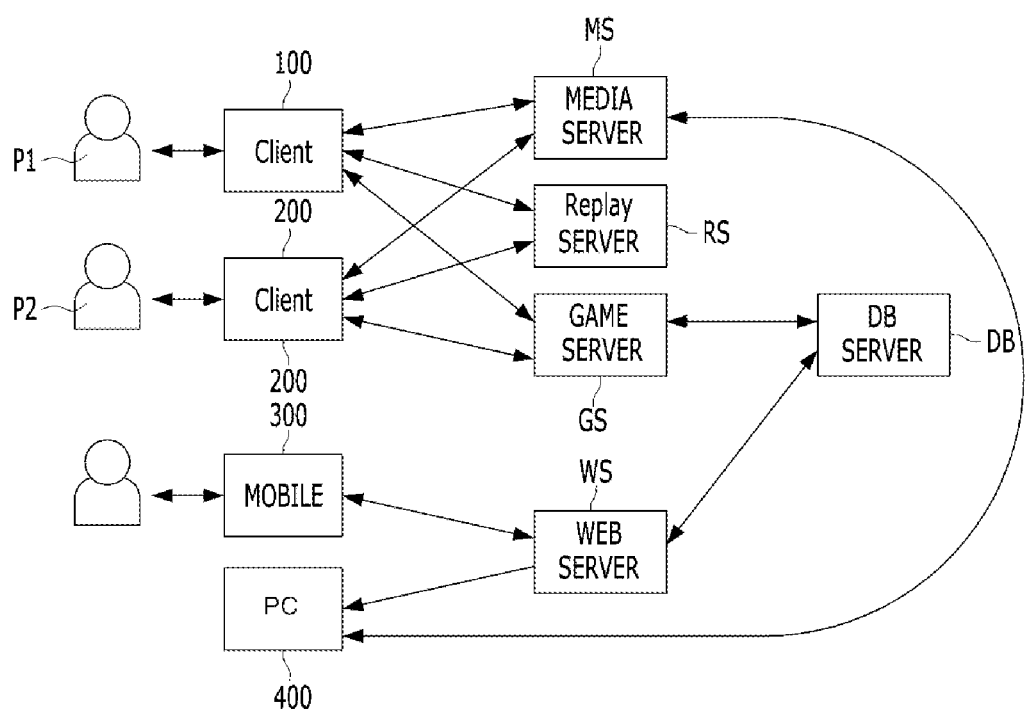

[Fig. 3]
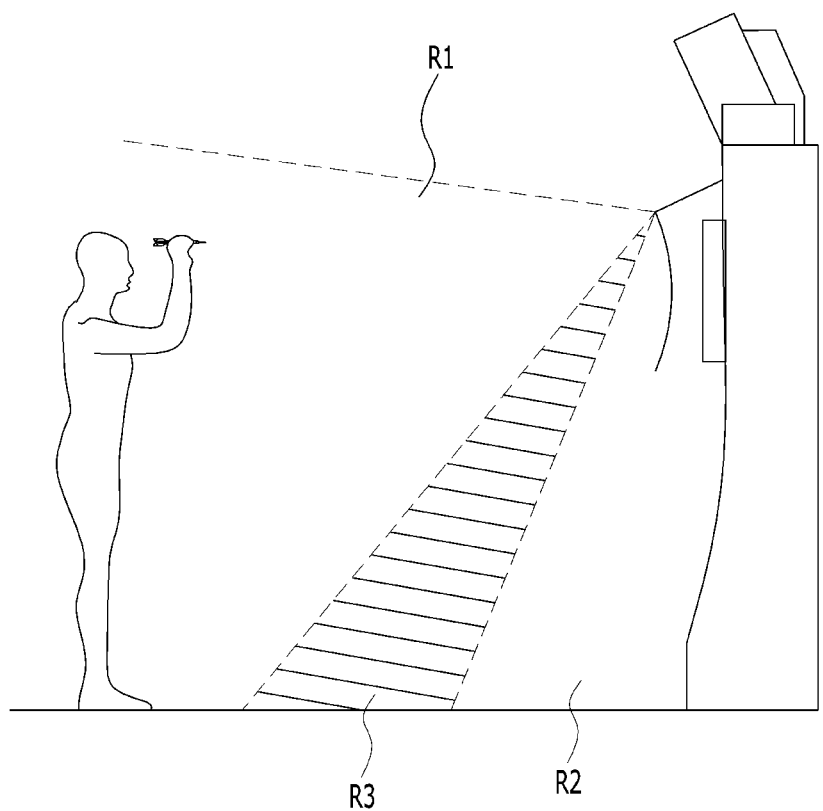

[Fig. 4]
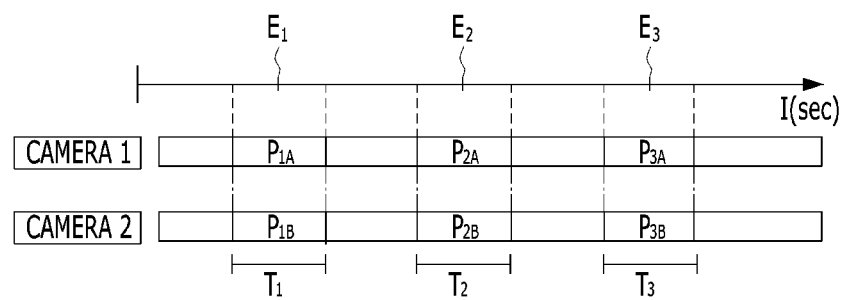

[Fig. 5]
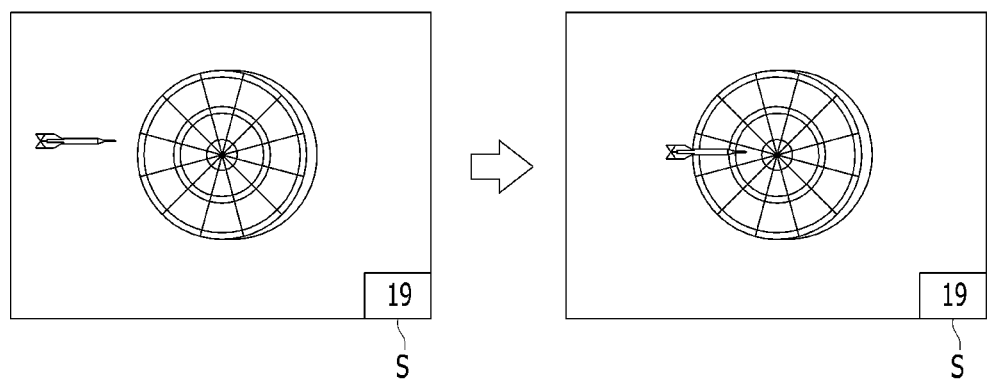

[Fig. 6]
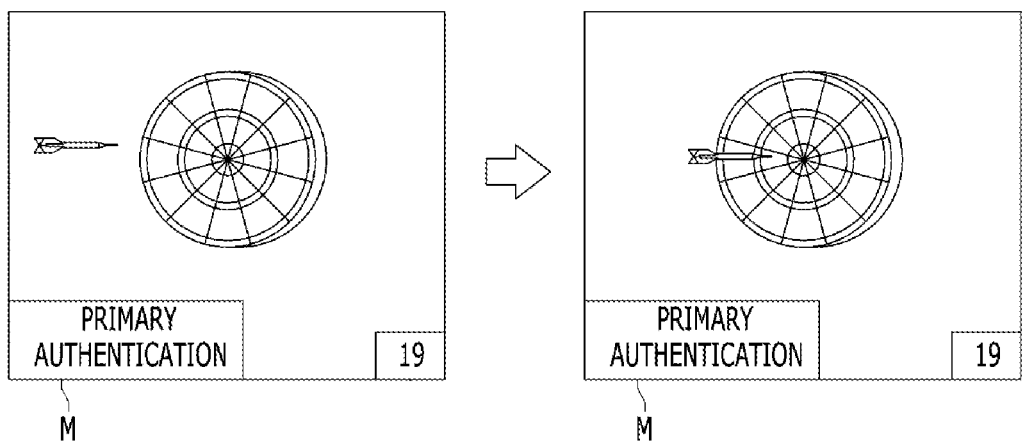

[Fig. 7]
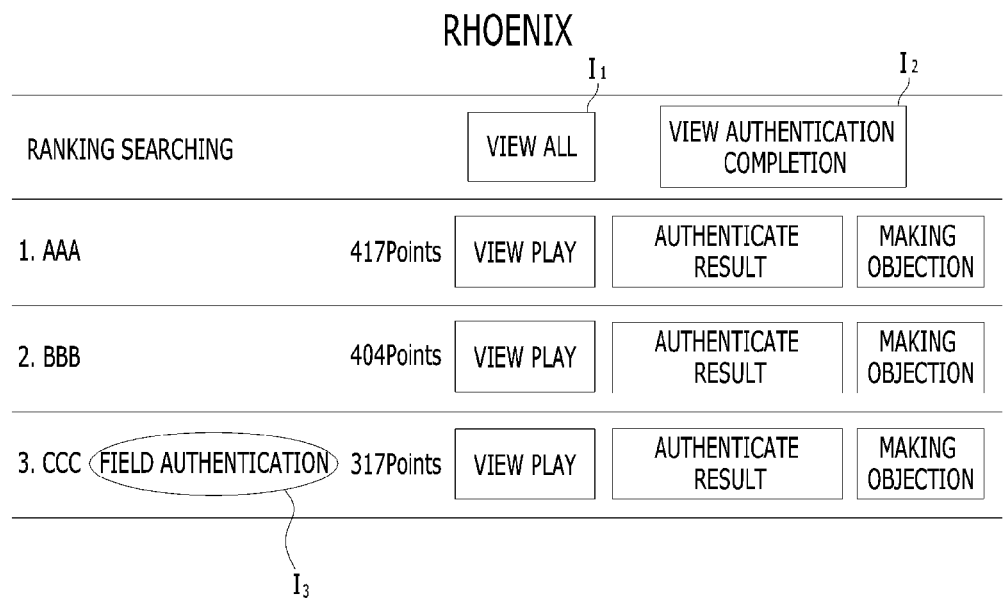

[Fig. 8]
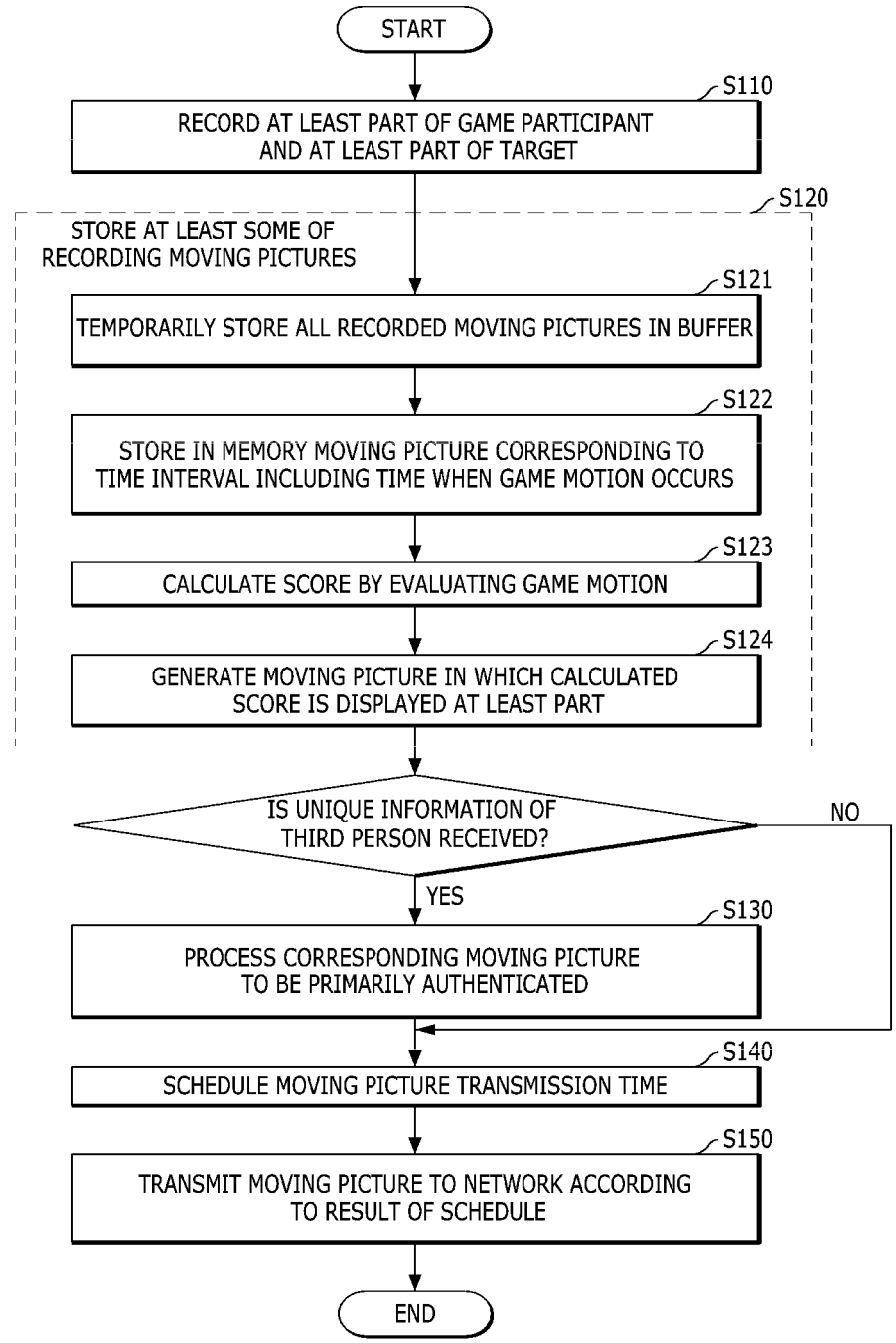

[Fig. 9]
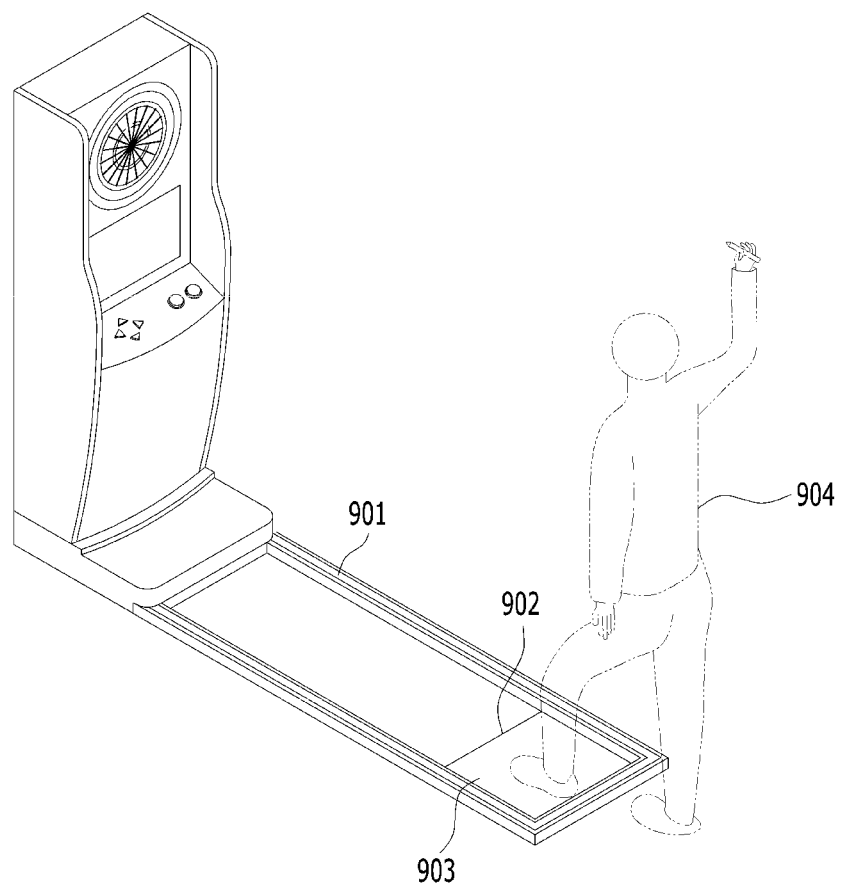

[Fig. 10]
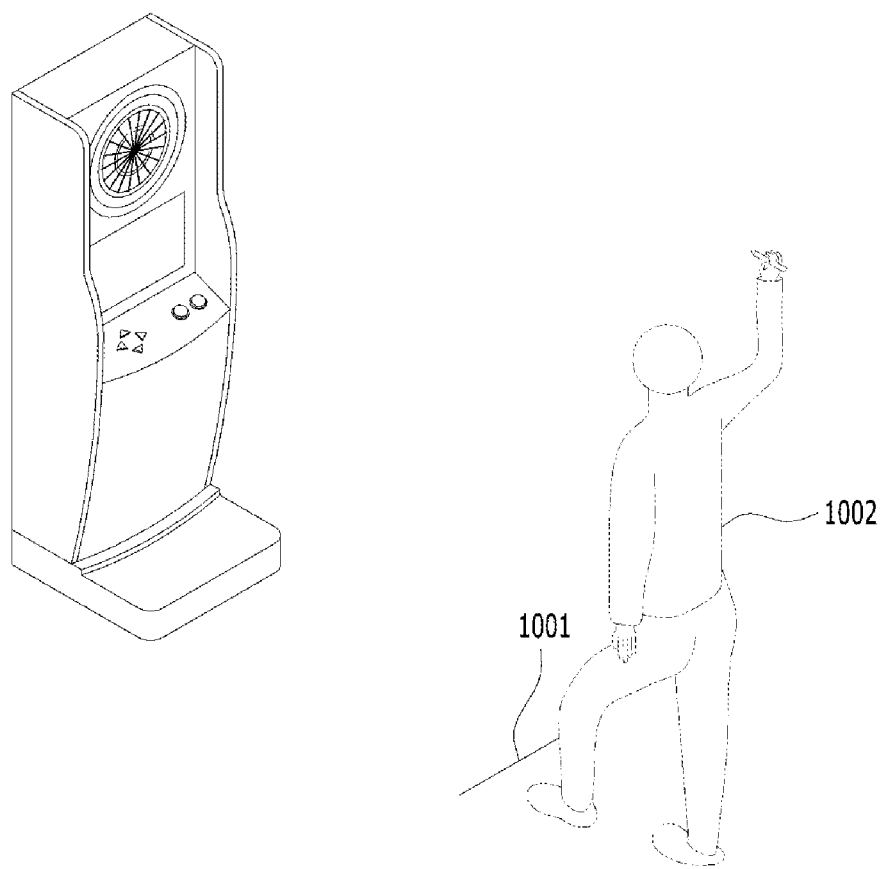

[Fig. 11]

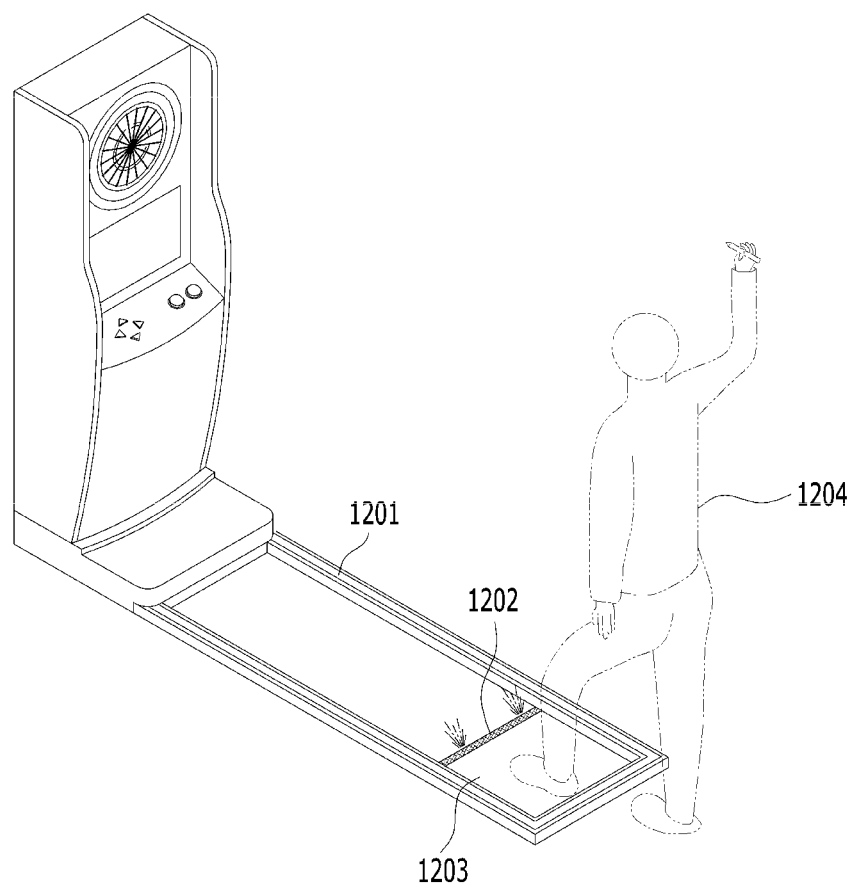
[Fig. 12]

[Fig. 13]
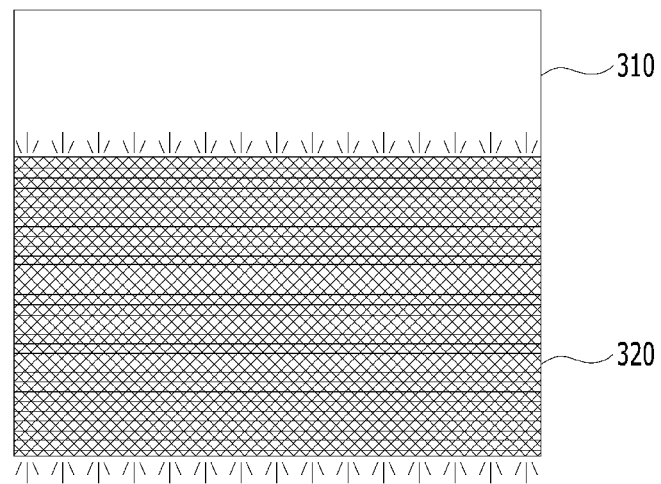

[Fig. 14]
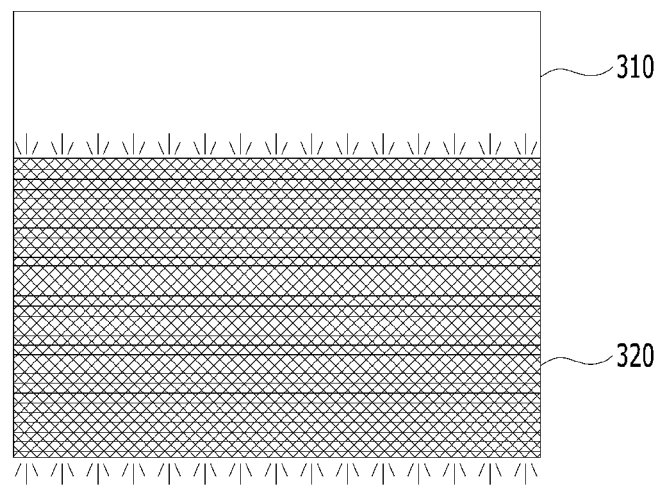

[Fig. 15]
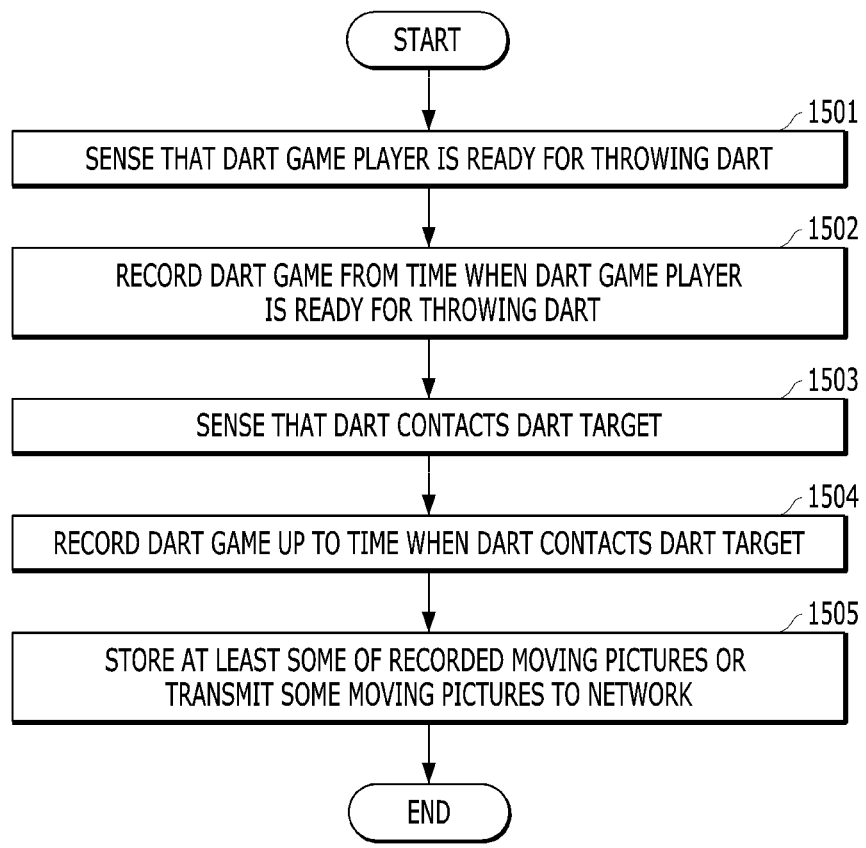

[Fig. 16]
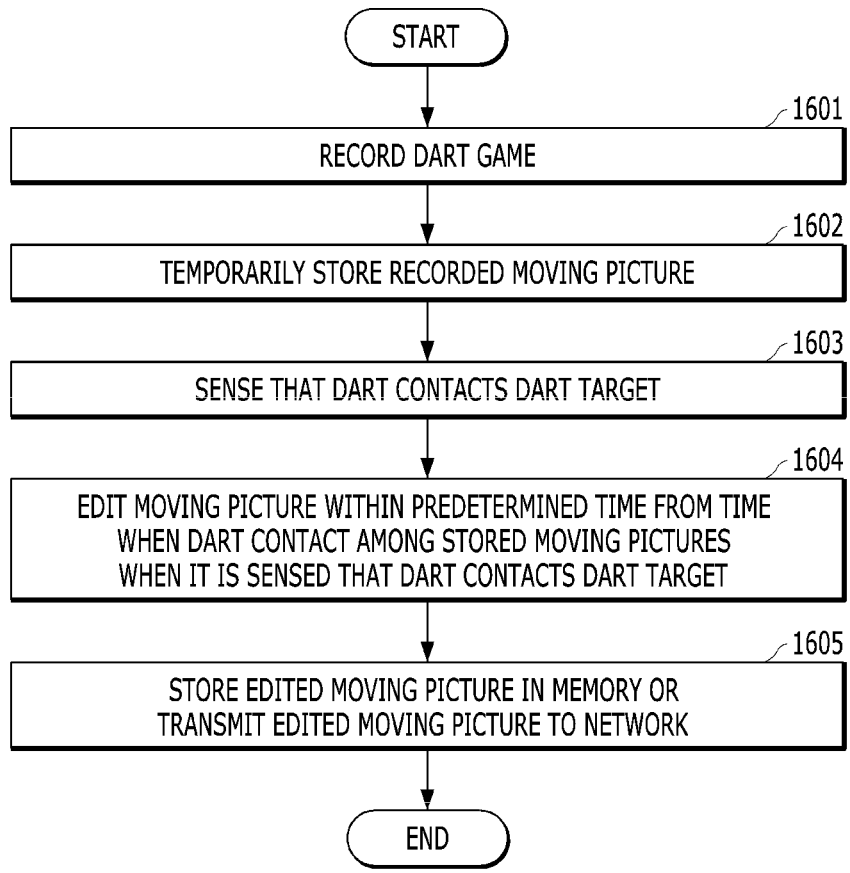

[Fig. 17]
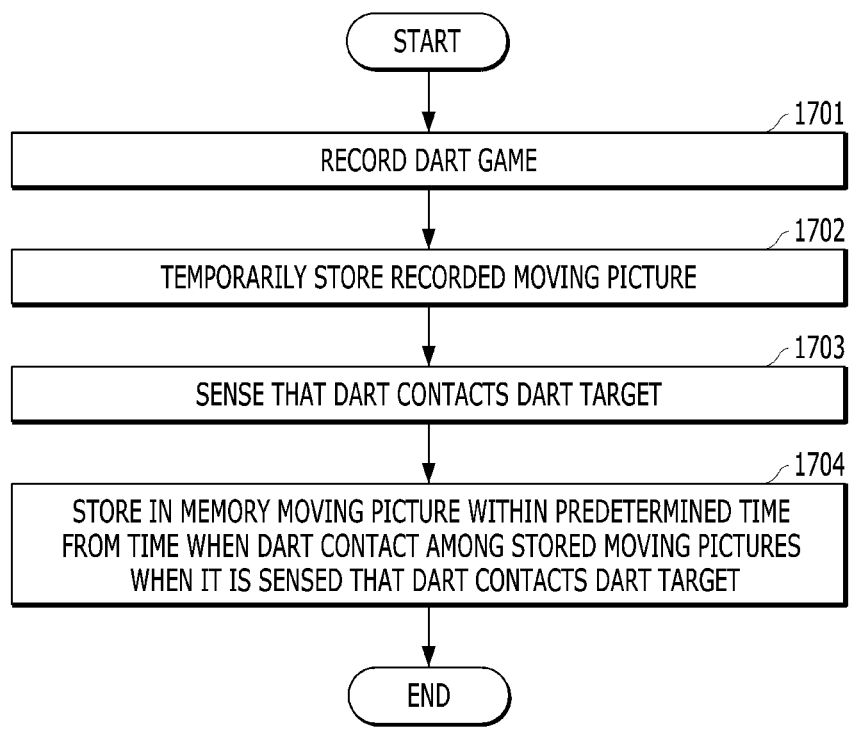

DART GAME DEVICE COMPRISING IMAGE-CAPTURE DEVICE FOR CAPTURING IMAGES OF DART GAMES

TECHNICAL FIELD

The present invention relates to a dart game apparatus including a recording apparatus for recording a dart game, and particularly, to a dart gate apparatus including a recording apparatus for verifying whether a dart game is righteously played.

BACKGROUND ART

In general, a dart means a 'small arrow' and is a game that makes a point by throwing an arrow-shaped dart pin to a centrifugal target with numerical figures, a dart game has an advantage in that anyone can enjoy the dart game anywhere anytime regardless of a season if only an arrowhead-shaped dart and a dart target are provided. In recent years, while various game methods have been developed and a scoring method is arranged, and as a result, the dart game has been developed as worldwide leisure, all adults and children have conveniently enjoyed the dart game.

However, in general, participants of the dart game need to participate in the game at the same time and in the same space in order to enjoy the dart game. However, with development of communication technology, each of the participants of the dart game may remotely participate in the dart game and remotely transmit a play result or a play process thereof through a communication network. As a result, the participants of the dart game may participate in the game over a temporal and spatial restriction.

When the participants of the game enjoy the dart game by mutually transmitting dart game play results thereof through the communication network, at least some of the dart game participants or a third person may preferably verify a dart game result or a dart game process of a counterpart for a righteous dart game.

Referring to a technical document (Korean Patent Unexamined Publication No. 10-2009-0078647) in the related art, disclosed is a method that records a moving picture by using a first camera deployed to record at least some of the game participants and a second camera deployed to record at least a part of the target and authenticates, when the game such as the dart game is remotely played through a configuration in which the recorded moving picture is transmitted through the network, the played game.

However, according to such a method, since the moving picture is transmitted by recording the entirety of the dart game, a capacity thereof is unnecessarily large, and as a result, a lot of time is required for transmitting data and an excessively long time is required to verify an image from the transmitted data, which becomes an obstacle in rapid progression of the dart game.

RELATED ART DOCUMENT

Patent Document (Patent Document 1) Korean Patent Unexamined Publication No. 10-2011-0021069

DISCLOSURE

Technical Problem

In order to solve the problem, an object of the present invention is to store or transmit only small-capacity data by recording only a part of a dart game or selecting and storing or transmitting only a part of an image of an entire dart game to reduce a burden in storing and transmitting data and remarkably reduce a time for verifying the data.

Technical Solution

In order to achieve the object, disclosed is a dart game apparatus for recording a moving picture of a part during a dart game. The dart game apparatus includes: a camera unit for recording the dart game; a touch unit for sensing that a dart game player is ready for throwing a dart; and a controller for controlling the camera unit, wherein the controller allows the camera unit to start recording at the time when the touch unit senses that the dart game player is ready for throwing the dart.

Further, the dart game apparatus may further include a sensing unit for sensing that the dart contacts a dart target, wherein, the controller may allow the camera unit to perform recording from the time when the touch unit senses that the dart game player is ready for throwing the dart up to the time when the sensing unit senses that the dart contacts the dart target.

In addition, the camera unit may include a first camera for recording at least a part of the dart game player and a second camera for recording at least a part of the dart target.

The dart game apparatus may further include a memory unit for storing at least a part of the moving picture recorded by the camera unit.

Moreover, the dart game apparatus may further include a network connection unit for transmitting the moving picture recorded by the camera unit to a network.

According to another embodiment of the present invention, disclosed a dart game apparatus for editing a part of a moving picture acquired by recording a dart game. The dart game apparatus may include: a camera unit for recording the dart game; a buffer unit for temporarily storing moving pictures recorded by the camera unit; a sensing unit for sensing that a dart contacts a dart target; and a controller for editing a moving picture within a predetermined time from the time when the dart contacts among the moving pictures stored in the buffer unit when the sensing unit senses that the dart contacts the dart target.

In addition, the dart game apparatus may further include a memory unit for storing the moving picture edited by the controller.

Further, the dart game apparatus may further include a network connection unit for transmitting the moving picture edited by the controller to a network.

Moreover, the dart game apparatus may further include a network connection unit for transmitting the moving picture stored in the memory unit to the network.

According to yet another embodiment of the present invention, disclosed is a dart game recording method for recording a moving picture of a part during a dart game by a dart game apparatus. The dart game recording method may include: sensing that a dart game player is ready for throwing a dart; and recording the dart game from the time when it is sensed that the dart game player is ready for throwing the dart.

Further, the dart game recording method may further include sensing that the dart contacts a dart target, wherein in the recording, the recording is performed during a period from the time of sensing that the dart game player is ready for throwing the dart up to the time of sensing that the dart contacts the dart target.

Further, in the recording, at least a part of the dart game player and at least a part of the dart target may be recorded.

Further, the dart game recording method may further include storing at least a part of the recorded moving picture.

In addition, the dart game recording method may further include transmitting the recorded moving picture to a network.

According to still another embodiment of the present invention, disclosed is a dart game recording and editing method for editing a part of a moving picture acquired by recording a dart game by a dart game apparatus. The dart game recording and editing method may include: recording the dart game; temporarily storing the recorded moving picture; sensing that a dart contacts a dart target; and editing a moving picture within a predetermined time from the time when the dart contacts among the stored moving pictures when it is sensed that the dart contacts the dart target.

Further, the dart game recording and editing method may further include storing the edited moving picture in a memory.

In addition, the dart game recording and editing method may further include transmitting the edited moving picture to a network.

Moreover, the dart game recording and editing method may further include transmitting the stored moving picture to the network.

According to still yet another embodiment of the present invention, disclosed is a computer-readable recording medium including a program code allowing at least one computer to record a moving picture of a part during a dart game by a dart game apparatus. The computer-readable recording medium may include: a program code for allowing at least one computer to sense that a dart game player is ready for throwing a dart; and a program code for allowing at least one computer to record the dart game from the time of sensing that the dart game player is ready for throwing the dart.

According to still yet another embodiment of the present invention, disclosed is a computer-readable recording medium allowing at least one computer to edit a part of a moving picture acquired by recording a dart game by a dart game apparatus. The dart game apparatus may include: a program code for allowing at least one computer to record the dart game; a program code for allowing at least one computer to temporarily store the recorded moving picture; a program code for allowing at least one computer to sense that the dart contacts a dart target; and a program code for allowing at least one computer to edit a moving picture within a predetermined time from the time when the dart contacts among the stored moving pictures when it is sensed that the dart contacts the dart target.

According to still yet another embodiment of the present invention, a dart game apparatus for storing a moving picture of a part of a dart game. The dart game apparatus may include: a camera unit for recording the dart game; a memory buffer unit for temporarily storing moving picture data acquired by recording the dart game; a memory unit for storing the moving picture data acquired by recording the dart game; a sensing unit for sensing that a dart contacts a dart target; and a controller storing moving picture data within a predetermined time based on the moment when the dart contacts in the memory unit from the memory buffer unit when the sensing unit senses that the dart contacts the dart target.

Advantageous Effects

According to a configuration of the present invention, since only a moving picture at a specific time in a dart game can be recorded, stored, or transmitted, problems caused by recording, storing, or transmitting too many moving picture data can be solved.

DESCRIPTION OF DRAWINGS

FIG. 1 is a block diagram of a data game apparatus according to an embodiment of the present invention.

FIG. 2 is a conceptual diagram of a game network including the dart game apparatus according to the embodiment of the present invention.

FIG. 3 is a diagram illustrating recording areas of first and second cameras.

FIG. 4 is a diagram illustrating a state in which a moving picture during a predetermined time interval including a moment when a dart game operation is sensed is stored in a memory.

FIG. 5 is a diagram illustrating a stored moving picture including a point of the dart game operation.

FIG. 6 is a diagram illustrating a dart game moving picture of which primary authentication is completed.

FIG. 7 is a diagram illustrating a webpage displaying a dart game result of which primary authentication is completed.

FIG. 8 is a flowchart illustrating a dart game data authenticating method of the dart game apparatus according to the embodiment of the present invention.

FIG. 9 illustrates a dart game apparatus including a touch unit according to an embodiment of the present invention.

FIG. 10 illustrates a dart game apparatus including a touch unit according to another embodiment of the present invention.

FIG. 11 illustrates a throw line and a touch unit according to the embodiment of the present invention.

FIG. 12 illustrates a dart game apparatus including a touch unit according to yet another embodiment of the present invention.

FIG. 13 illustrates a dart game apparatus including a touch unit according to still another embodiment of the present invention.

FIG. 14 illustrates a throw line and a touch unit according to another embodiment of the present invention.

FIG. 15 illustrates a flowchart of a dart game recording method for recording a moving picture of a part during a dart game by a dart game apparatus according to an embodiment of the present invention.

FIG. 16 illustrates a flowchart of a dart game recording and editing method for editing a part of a moving picture acquired by recording a dart game by a dart game apparatus according to another embodiment of the present invention.

FIG. 17 illustrates a flowchart of a method for storing a partial moving picture of a moving picture acquired by recording a dart game by a dart game apparatus according to yet another embodiment of the present invention.

BEST MODE

Various embodiments will be described below with reference to the drawings. Various descriptions are presented through the embodiments for exemplification in the following description. However, it is apparent that the embodiments can be executed without the specific description. In other examples, known structures and apparatuses are presented in a block diagram form in order to facilitate description of the embodiments.

"Component", "module", "system", and the like which are terms used in the specification designate a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or execution thread and one component may be localized in one computer or distributed among two or more computers. Further, the components may be executed by various computer-readable media having various data structures, which are stored therein. The components may perform communication through local and/or remote processing according to a signal (for example, data through other system and a network such as the Internet through data and/or a signal from one component that interacts with other components in a local system and a distribution system) having one or more data packets, for example.

Further, various aspects or features presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" include a wireless channel and various other media that can store, posses, and/or transfer command(s) and/or data, but are not limited thereto.

FIG. 1 is a block diagram of a dart game apparatus according to an embodiment of the present invention.

The dart game apparatus 100 may include a dart target 110, a sensing unit 120, a user input unit 130, an output unit 140, a camera unit 150, a network connection unit 160, a user authentication unit 170, a memory 180, a controller 190, and the like. The components illustrated in FIG. 1 are not essential components. Therefore, a mobile terminal having more components therethan or less components therethan may be implemented.

Hereinafter, the components will be described in sequence.

The dart target 110 may mean a score board in which a bullseye is positioned at the center and areas segmented by a concentric circle centering the bullseye and straight lines extended radially from the bullseye and granted with individual scores, respectively are present. Multiple holes into which a tip of a dart may be inserted may be deployed on the score board.

The dart target 110 includes a display 142 to be described below to variably change score deployment of the dart target 110 and shapes of areas granted with the scores. In this case, the dart target 110 includes an optical transmissive touch pad in the display 142 to be stacked to have a form of a touch screen.

The sensing unit 120 senses a play of a dart game player performed with respect to the dart target 110 to evaluate a play of an actual game player. The sensing unit 120 may sense that a dart contacts the dart target with respect to a play in which the game player throws the dart and sense which area of the dart target 110 the thrown dart hits. The sensing unit 120 electrically converts a signal meaning that the dart contacts the dart target and a score corresponding to the area which the dart hits to transmit the converted signal and score to the controller 190.

The user input unit 130 receives an input of a user for controlling the dart game apparatus 100. The user input unit 130 may include a keypad, a dome switch, a touch pad (resistive/capacitive), a jog wheel, a jog switch, or the like. The user input unit 130 may also include cameras 151 to 153 or a microphone.

The user may select a dart game mode, the number of dart game players, a dart game play scheme, and the like through the user input unit 130. For example, the user may select the number of dart game players, the dart game play scheme (a zero one game, a cricket game, and the like), and the dart game mode (a single play, a network play, and the like) through the user input unit 130.

The user input unit 130 receives a signal by sensing a key operation or a touch input of the user or receives voice or a motion through the cameras 151 to 153 of a user or the microphone to convert the received signal, voice, or motion into an input signal. To this end, known speech recognition technology or motion recognition technologies may be used.

The output unit 140 which is used for generating an output related with sight, hearing, or touch may include a sound output module 141, a display 142, a notification unit 143, and the like.

The sound output module 141 may output audio data received from the network connection unit 160 or stored in the memory 180 in a sound effect of the game, a game motion guide, a game method description, and the like. The sound output module 141 may output a sound signal related with a function (e.g., a game effect sound) performed by the dart game apparatus 100. The sound output module 141 may also output a voice of a game player or a third person using another dart game apparatus 200 (see FIG. 2) received through the network connection unit 160. The sound output module 141 may include a receiver, a speaker, a buzzer, and the like.

The display 142 displays (outputs) information processed in the dart game apparatus 100. For example, when the dart game apparatus 100 is in a game play scheme guidance mode, the display 142 may output a selectable game play scheme. When the dart game apparatus 100 play a game, the display 142 may display the score sensed through the sensing unit 120 or output an image acquired by recording the game player or the third person using another dart game apparatus 200 (see FIG. 2) received through the network connection unit 160.

The display 142 may include at least one of a liquid crystal display (LCD), a thin film transistor-liquid crystal display (TFT LCD), an organic light-emitting diode (OLED), a flexible display, and a 3D display.

Some displays thereamong may be configured as a transparent or optical transmissive type to view the outside therethrough. This may be called a transparent display and a representative example of the transparent display includes a transparent OLED (TOLED), and the like.

Two or more displays 142 may be present according to an implementation form of the dart game apparatus 100. For example, in the dart game apparatus 100, multiple displays may be deployed on one surface to be separated or integrally and further, deployed on different surfaces, respectively.

A touch sensor may be configured to convert pressure applied to a specific portion of the display 142 or a change in capacitance generated at the specific portion of the display 142 into an electrical input signal. The touch sensor may also be configured to detect pressure in touch as well as a touched location or area.

When there is a touch input for the touch sensor, a signal(s) corresponding thereto is sent to a touch controller. The touch controller processes the signal(s) and thereafter, transmits data corresponding thereto to the controller 190. As a result, the controller 190 may know which area of the display 142 is touched.

The notification unit 143 outputs a signal for notifying occurrence of an event of the dart game apparatus 100. Examples of the event which occurs in the dart game apparatus 100 include identification of the dart game player, direct hit of the dart, a change of the dart game player, game over, and the like. The notification unit 143 may output in another form other than a video signal or an audio signal, for example, a signal for notifying the occurrence of the event by vibration. The notification unit 143 may include a light emission diode (LED) and notify the occurrence of the event to the user through flickering of the LED.

The camera unit 150 includes multiple cameras 151 to 153, and as a result, an image frame processed by the cameras 151 to 1153 may be stored in the memory 180 or transmitted to the outside through the network connection unit 160. Two or cameras 150 may be provided according to a use environment.

At least some cameras of the camera unit 150 may be deployed to record an image frame including the dart target 110 and other some cameras may be deployed to record an image frame directly related with a game rule in the dart game play. For example, the camera may be deployed to record a throw-line on which the dart is thrown in order to record the image frame directly related with the dart game rule. The multiple cameras 151 to 153 included in the camera unit 150 may be deployed to record at least some image frames to overlap with each other.

When the camera unit 150 includes one camera, the camera may be a panorama camera deployed to record both at least a part of the dart target 110 and the image frame (e.g., the throw-line in the dart game) directly related with the game rule.

The network connection unit 160 may include one or more modules that enable wireless communication between the dart game apparatus 100 and a wired/wireless communication system or between the dart game apparatus 100 and a network on which the dart game apparatus 100 is positioned.

The network connection unit 160 may include a wired/wireless Internet module for accessing the network. As the wireless Internet technology, wireless LAN (WLAN) (Wi-Fi), wireless broadband (Wibro), world interoperability for microwave access (Wimax), high speed downlink packet access (HSDPA), or the like, may be used. As wired Internet technology, digital subscriber line (XDSL), fibers to the home (FTTH), power line communication (PLC), or the like may be used.

Further, the network connection unit 160 includes a short-range communication module to transmit and receive data to and from an electronic apparatus positioned in a comparatively short range from the dart game apparatus 100 and including the short-distance communication module. As short range communication technology, Bluetooth, radio frequency identification (RFID), infrared data association (IrDA), ultra wideband (UWB), ZigBee, or the like may be used.

The network connection unit 160 may sense a connection state of the network and a transceiving speed of the network.

Data received through the network connection unit 160 may output through the output unit 140, stored through the memory 180, or transmitted to other electronic apparatuses positioned in a short range through the short-range communication module. The user authentication unit 170 recognizes unique information of a long-range user by using a radio wave through the RFID technology which is a kind of the short-range communication technology. For example, the user may possess a card, a mobile terminal, or unique dart game equipment, for example, personal dart equipment possessed thereby, which includes an RFID module. Information (e.g., a personal ID, an identification code, and the like of the user registered in the database server (DB) (see FIG. 2) for identifying the user may be recorded in the RFID module possessed by the user. The dart game apparatus 100 identifies the RFID module possessed by the user to identify a dart game player which plays the game by using the dart game apparatus 100 and update a database for the identified dart game player or accumulate new data.

The user authentication unit 170 may include various technologies (e.g., the short-range communication technology such as the Bluetooth, and the like) that may transmit and receive unique information of the user by a contact/non-contact method in addition to the RFID technology. Further, the user authentication unit 170 may include a biodata identification module that identifies biodata (voice, a fingerprint, and a face) of the user by interworking with the microphone and the touch pad of the user input unit 130, the camera unit 150, and the like.

The memory 180 may store a program for a motion of the controller 190 therein and temporarily store input/output data (e.g., a phone book, a message, a still image, a moving picture, or the like) therein. The memory 180 may store data regarding various patterns vibrations and sounds output in the touch input on the touch screen.

The memory 180 may include at least one storage medium of a flash memory type storage medium, a hard disk type storage medium, a multimedia card micro type storage medium, a card type memory (for example, an SD or XD memory, or the like), a random access memory (RAM), a static random access memory (SRMA), a read-only memory (ROM), an electrically erasable programmable read-only memory (EEPROM), a programmable read-only memory (PROM), a magnetic memory, a magnetic disk, and an optical disk. The dart game apparatus 100 may operate in connection with a web storage performing a storing function of the memory 180 in the Internet.

The controller 190 generally controls all motions of the dart game apparatus 100. For example, in the case of the dart game, the score sensed through the sensing unit 120 is aggregated for each game participant, the aggregated score is transmitted to and received from another dart game apparatus 200 connected through the network, and a game winning/losing record according to the aggregation result, the score, and the like is recorded.

The controller may perform pattern recognition processing to recognize a motion input, a writing input, and the like performed in the touch screen or the camera as a letter or an image. Further, the controller may perform speech recognition by using a speech-to-text (STT) function to recognize the speech input through the microphone as the letter.

Various embodiments described herein may be implemented in a recording medium or a recording medium readable by a computer a device similar to the computer by using, for example, software, hardware, or a combination thereof.

According to hardware implementation, the embodiment described herein may be implemented by using at least one of ASICs (application specific integrated circuits), DSPs (digital signal processors), DSPDs (digital signal processing devices), PLDs (programmable logic devices), FPGAs (field programmable gate arrays, processors, controllers, microcontrollers, microprocessors, and electric units for performing other functions. In some cases, the embodiments described in the specification may be implemented by the controller 190 itself.

According to software implementation, embodiments such as a procedure and a function described in the specification may be implemented by separate software modules. Each of the software modules may perform one or more functions and operations described in the specification. A software code may be implemented by a software application written by an appropriate program language. The software code may be stored in the memory 180 and executed by the controller 190.

The dart game apparatus 100 may include a touch unit 195 positioned in a predetermined area adjacent to the throw line indicating a location where the dart game player throws the dart and authenticating whether the dart game player righteously executes the dart game.

The touch unit 195 may be extended in a direction distant with respect to the dart target 110 from the throw line and it may be authenticated that the dart game is righteously performed only when the dart game player throws the dart while touching the touch unit 195.

FIG. 9 illustrates the dart game apparatus including a touch unit according to the embodiment of the present invention.

Referring to FIG. 9, the dart game apparatus 100 may include a bottom part 901. In an embodiment, the bottom part 901 as a form to soar from a ground by a predetermined height may include a throw line 902 and a touch unit 903.

The touch unit 903 occupies a predetermined area of the bottom part 901 in a distant from the dart target on the throw line 902. Only when a dart game player 904 throws the dart while touching the touch unit 903, for example, only when the dart game player 904 throws the dart while stepping on the touch unit 903, a score of the dart game player 904 may be accepted. By such a configuration, it may be authenticated that the game is righteously performed by a scheme in which the dart game player throws the dart at a righteous location even though the dart game players at remote places do not verify mutual plays with their eyes in a remote multi game mode.

FIG. 10 illustrates a dart game apparatus including a touch unit according to another embodiment of the present invention.

Referring to FIG. 10, the bottom part does not soar from the ground by the predetermined height and is buried in the ground unlike FIG. 9. Alternatively, in the embodiment, the bottom part is not separately provided, but may mean an area including a throw line 1001 and a touch unit.

In FIG. 10, only the throw line 1001 is recognized by a dart game player 1002 and only when the dart game player performs play while touching, for example, stepping on the predetermined area in the direction distant from the dart target on the throw line 1001, it may be authenticated that the dart game player righteously executes the dart game.

FIG. 11 illustrates a throw line 210 and a touch unit 220 according to the embodiment of the present invention.

Referring to FIG. 11, since the touch unit 220 is provided in the form of a predetermined quadrangular area adjacent to the throw line 210, only when the dart game player performs playtouches, for example, steps on the touch unit 220, it may be authenticated that the dart game player righteously executes the dart game.

FIG. 12 illustrates a dart game apparatus including a bottom part according to yet another embodiment of the present invention.

The sound output module 141, the display 142, or the notification unit 143 described with reference to FIG. 1 may be included in multiple facilities which may be included in the dart game apparatus 100. The multiple facilities may include at least one of the dart game device, the throw line, a path, a pole, a wall, a table, and a chair. In the case of the sound output module 141, the display 142, or the notification unit 143 included in the multiple facilities, a flickering scheme, a pattern of a change in color and of the notification unit 143 or the display 142 and a pattern of a sound effect of the sound output module 141 may be changed with occurrence of the events which occur in the dart game and a change in pattern may be controlled by the controller 190. The notification unit 143 may be, for example, an LED illumination unit as described above.

The memory 180 may store patterns of the sound output module 141, the display 142, or the notification unit 143 included in the multiple facilities.

Referring to FIG. 12, the dart game apparatus 100 may include a bottom part 1201. In an embodiment, the bottom part 1201 as a form to soar from a ground by a predetermined height may include a throw line 1202 and a touch unit 1203.

The touch unit 1203 occupies a predetermined area of the bottom part 1201 in a distant from the dart target on the throw line 1202. Only when the dart game player 1204 throws the dart while touching the touch unit 1203, for example, only when the dart game player 1204 throws the dart while stepping on the touch unit 1203, a score of the dart game player 1204 may be accepted.

Only when events which occur in the dart game occur, the notification unit 143 executes a predetermined illumination pattern, and as a result, the throw line 1202 as a form including the notification unit 143, for example, an LED illumination may be recognized by the dart game player.

In the embodiment, the bottom part 1201 which is formed by a semi-transmissive member may be so transparent that the dart game player may recognize the bottom part 1201 only when the alarm unit 143 of the throw line 1202 is lit up, but so opaque that the dart game player cannot determine a location in which the illumination unit is buried when the alarm unit 143 is lit out. Since the alarm unit of the throw line is not lit up when the event of the dart game does not occur, for example, when the dart game apparatus does not start, the dart game player may not recognize the throw line. However, when the dart game player starts the dart game apparatus, the alarm unit is lit up at the time of initially starting the game, and as a result, the throw line 1202 may be displayed. For example, the dart game apparatus may be a type that may start only by inserting a coin and in this case, only when the dart game player starts the game by inserting the coin, the illumination unit of the throw line is lit up to display the throw line.

The semi-transmissive member is installed as described above and the alarm unit capable of displaying at least the throw line is buried therebelow and the illumination unit of the throw line is lit up only when the user starts the dart game apparatus in order to prevent the user from perform an exercise dart from being played on the throw line while the user does not start the dart game device, in particular, does not insert the coin when the dart game device is a type which may start only by inserting the coin. When the user does not start the dart game device, since the user does not know an accurate distance of the throw line, it is possible to prevent the user from occupying the dart game device to play the exercise dart. In particular, when the dart game apparatus is a form to start only by inserting the coin, it is possible to prevent the user from playing the exercise dart without expense.

According to the embodiment, when the event which may occur in the dart game occurs, for example, when the dart game player starts the dart game apparatus by righteously playing the expense, the throw line 1202 including the alarm unit 143 buried in the bottom part 1201 as the opaque member may be recognized by the dart game player by activation of the alarm unit 143 and only when the dart game player touches the touch unit 1203 positioned in a direction distant with respect to the dart target on the throw line 1202, for example, throws the dart while stepping on the touch unit 1203, it may be accepted that the dart game is righteously played in a remote multi mode game.

FIG. 13 illustrates a dart game apparatus including a touch unit according to still another embodiment of the present invention.

Referring to FIG. 13, the bottom part made of a semi-transmissive material may be buried in the ground. The bottom part may include a throw line 1301 and may include a touch unit that extends in a direction distant from the target from the throw line 1301.

The throw line 1301 may include the alarm unit 143 and as described with reference to FIG. 12, when the event which occurs in the dart game occurs, for example, when a dart game player 1302 starts the dart game apparatus by righteously paying the expense, the throw line 1301 including the alarm unit 143 buried in the bottom part as the opaque member may be recognized by the dart game player by the activation of the alarm unit 143 and only when the dart game player touches a touch unit positioned in a direction distant from the dart target on the throw line 1301, for example, the dart game player throws the dart while stepping on the touch unit, it may be accepted that the dart game is righteously played in the remote multi mode game.

FIG. 14 illustrates a throw line and a touch unit according to another embodiment of the present invention.

Referring to FIG. 14, a touch unit 320 may include the alarm unit 143 and when the event which occurs in the dart game occurs, for example, when the dart game player starts the dart game apparatus by righteously paying the expense, the touch unit 320 including the alarm unit 143 buried in the bottom part as the opaque member may be recognized by the dart game player by the activation of the alarm unit 143 and only when the dart game player touches the touch unit 320, for example, the dart game player throws the dart while stepping on the touch unit 320, it may be accepted that the dart game is righteously played in the remote multi mode game.

As naturally recognized by those skilled in the art, a description with reference to FIGS. 9 to 14 is just an example and the sound output module 141, the display 142, and the alarm unit 143 may be installed in at least one of the bottom part, the throw line, and the touch unit and at least one thereof may be appropriately displayed with the occurrence of the event.

Some of the cameras of the camera unit 150 may be used to record at least a part of the dart target and some cameras may start recording when the dart game player touches the touch unit. Further, some of the cameras of the camera unit 150 may be used to record at least a part of the dart game player and the cameras may start recording when the dart game player touches the touch unit.

The camera unit 150 will be described below in more detail.

According to an embodiment of the present invention, when a touch unit 195 is touched by the dart game player, it may be determined that the dart game player is normally positioned in the rear of the throw line 210 in order to throw the dart. That is, when the dart game player touches the touch unit 195, it may be determined that the dart game player is ready for throwing the dart.

The controller 190 may allow the camera unit 150 to start the recording at the time when the touch unit 195 senses that the dart game player is ready for throwing the dart.

Since the recording starts from the time when the dart game player is ready for throwing the dart, the quantity of recorded moving pictures may be reduced.

When the sensing unit 120 senses that the dart contacts the dart target, it may be determined that a dart throwing action of the dart game player ends and since a moving picture acquired by recording the dart throwing action of the dart game player is required to verify righteousness of the dart game, the moving picture needs not be recorded any longer when the sensing unit 120 senses the contact of the dart.

Therefore, the controller 190 allows the camera unit to perform the recording from the time when the touch unit 195 senses that the dart game player is ready for throwing the dart up to the time when the sensing unit 120 senses that the dart contacts the dart target to reduce the quantity of the recorded moving pictures.

The moving picture recorded by the camera unit 150 may be stored in the memory 180 or transmitted to the outside through the network connection unit 160.

According to another embodiment of the present invention, the quality of moving pictures may be reduced by editing the moving picture based on the time when the sensing unit 120 senses that the dart contacts the dart target. The camera unit 150 may record the dart game when the dart game apparatus starts. The dart game apparatus may start by inserting the coin, the touch of the touch unit 195 by the dart game player, start switch-on of the dart game apparatus, and the like. The moving picture recorded by the camera unit may be stored in a memory buffer unit 181 for temporarily storing data. The controller 190 may determine that the dart game player throws the dart and edit the moving picture within a predetermined time from the time when the dart contacts among the moving pictures stored in the buffer unit when the sensing unit 120 senses that the dart contact the dart target. Since a moving picture required to determine whether the dart game is righteously executed is primarily from the moment when the dart game player throws the dart up to the moment when the dart contacts the dart target, the predetermined time will be a short time from the moment when the dart game player throws the dart up to the moment when the dart contacts the dart target.

The moving picture within the predetermined time from the moment when the dart contacts, which is edited among the recorded moving pictures may be stored in the memory 180 or transmitted through the network connection unit 160.

According to yet another embodiment of the present invention, the moving picture acquired by recording the dart game may be stored in the memory buffer unit 181 in a first in first out scheme. When the dart contacts the dart target, the sensing unit 120 may recognize that the dart contacts the dart target. When it is recognized that the dart contacts the dart target, the controller 190 may store moving picture data within the predetermined time based on the time when the dart contacts the dart target among moving picture data stored in the memory buffer unit 181, in the memory unit 180.

For example, the controller 190 may store moving picture data before and after the predetermined time from the time when the dart contacts the dart target among the moving picture data stored in the memory buffer unit 181, in the memory unit 180. A time before and after the predetermined time may be, for example, from a time before 5 minutes from the time when the dart contacts the dart target to a time after 1 minute from the time when the dart contacts the dart target by considering a time when the dart flies up to the dart target by throwing the dart after the dart game player is ready for throwing the dart. This is just an example and a time appropriate to determine the righteousness of the dart game may be arbitrarily determined.

Hereinafter, a state in which the dart game apparatus according to the embodiment of the present invention is connected with the network will be described in more detail with reference to the drawings.

FIG. 2 is a conceptual diagram of a game network including a dart game apparatus according to an embodiment of the present invention.

As illustrated in FIG. 2, the dart game apparatus 100 used by a first game player P1 may be connected with one or more servers (a media server MS, a relay server RS, and a dart game server GS) through the network.

Multiple dart game players may enjoy the dart game in the same space at the same time by using the same first dart game apparatus 100. However, when a second dart game player P2 positioned at a remote range from the first dart game player P1 intends to participate in the dart game, the second dart game player P2 is connected with one or more servers (the media server MS, the relay server RS, and the dart game server GS) through the network by using the second dart game apparatus 100 to transmit and receive information to and from the first dart game apparatus 100, thereby performing the dart game. The first dart game apparatus 100 and the second dart game apparatus may transmit and receive information via one or more servers (the media server MS, the relay server RS, and the dart game server GS) or directly transmit and receive the information between the dart game apparatuses 100 and 200.

The dart game may be performed by differentiating places at which both dart game players P1 and P2 perform a play at the same time or performed by a method in which both dart game players P1 and P2 play the dart game at different placesat different time and decide winning/losing or a ranking by storing play contents in the DB server DB.

The media server MS may store dart game play moving pictures of the dart game players P1 and P2, which are stored by using the camera or the microphone stored in the dart game apparatuses 100 and 200. The media server MS may be included in the DB server DB.

The relay server RS connects communication between the multiple dart game apparatuses 100 and 200. The relay server RS forms a communication network between the multiple dart game apparatuses 100 and 200 positioned at the remote range to form a peer-to-peer (P2P) network.

The game server GS may exchange information (a score acquired by each game player and information for mutual communication among the respective game players) between the dart game apparatuses 100 and 200, transmit an advantage or a warning based on a game rule through the respective dart game apparatuses 100 and 200, or in addition, perform transmission and reception of information required to perform the dart game and controlling the dart game apparatuses 100 and 200. The dart game server GS aggregates winning/losing of the dart game and scores of the respective dart game players 100 and 200 to transmit the aggregated winning/losing and scores to the DB server.

The DB server may store personal information of the respective dart game players 100 and 200, winning/losing and ranking information of the game, score information for each game, or a replay moving picture for each game. The DB server may store the information segmented for each user. The DB server may grant a unique code to each user and manage information for each user by using the unique code. The unique code may be stored in the RFID module (an RFID card or an RFID module stored in the mobile terminal) possessed by each user. As a result, the game apparatuses 100 and 200 may identify each game player through the included user authentication unit 170. The DB server may also grant the unique code for identification even to the respective dart game apparatuses 100 and 200 and manage the dart game data for each identification code granted to the dart game apparatuses 100 and 200.

The dart game player may access a web server WS by using a mobile 300 (including electronic apparatuses such as the mobile terminal, a cellular phone, a PDA, a PDP, and the like, which have a mobile communication function) or a PC 400. The web server WS may be connected with the mobile and the mobiles 300 and 400 by using an Internet or an intranet. Further, the web server WS may be connected even with the dart game apparatuses 100 and 200. The web server WS is connected with the DB server DB to provide the dart game data stored in the DB server to the dart game player.

As illustrated in FIG. 1, the dart target 110 may include predetermined multiple segmented areas. For example, the bullseye may be deployed at the center, multiple areas may be segmented by multiple concentric circles around the center and straight lines extended radially and the score may be given for each area.

In an embodiment of the present invention, the camera unit 150 may include multiple cameras 151 to 153.

A first camera 151 included in the camera unit 150 may be deployed to record at least a part of the dart game player. For example, the first camera 151 may record at least a part of the dart game player, which includes the throw line. In the dart game, there are many cases in which whether to violate the game rule depends on whether the dart game player illegally crosses the throw line. Therefore, when the first camera 151 records the image frame including the throw line, the first camera 151 may record a moving picture including the image frame required to determine whether the dart game player illegally plays the dart game.

A second camera 152 included in the camera unit 150 may be deployed to record at least a part of the dart target.

FIG. 3 is a diagram illustrating recording areas of first and second cameras.

As illustrated by a dashed-line of FIG. 3, the first camera 151 may record a region R1 including at least a part of the game player. As illustrated by a solid line, the second camera 152 may record a region R2 including at least a part of the dart target. As illustrated in FIG. 3, the first camera 151 and the second camera 152 may include a common recording region R3.

The controller 190 may generate a panorama image acquired by connecting images recorded by the first camera 151 and the second camera 152 by using the common recording region R3.

The memory 180 may store at least some of moving pictures recorded by the first and second cameras. The moving pictures stored in the memory 180 may be transmitted to the outside by the network connection unit 160 and thereafter, deleted.

The network connection unit 160 may transmit the moving pictures stored in the memory 180 to the network. The moving pictures may be transmitted to the media server MS or transmitted to the data base server DB through the game server GS.

In another embodiment of the present invention, the sensing unit 120 may sense a game motion for the dart target 110. For example, the sensing unit 120 senses a hitting location of the dart on the dart target and converts the sensed location into a score corresponding to the hitting location to transfer the score to the controller 190. The controller 190 may store in the memory a moving picture during a predetermined time interval including the time when the game motion (e.g., a motion by which the dart hits the dart target 110 in the case of the dart game) is sensed by the sensor.

In yet another embodiment of the present invention, the controller 190 may sense the time when the game motion occurs by using the moving picture stored in the memory and store in the memory a moving picture during a predetermined time interval including the time when the game motion is sensed.

The controller 190 may analyze (e.g., determine that the game motion is sensed when a dart moving rapidly is captured in the moving picture) the moving picture by using known image processing technology.

FIG. 4 is a diagram illustrating a state in which a moving picture during a predetermined time interval including a moment when a dart game motion is sensed is stored in a memory.

As illustrated in FIG. 4, the dart game apparatus 100 may sense moments (e.g., moments when the dart hits the dart target; E1, E2, and E3) when the dart game motion occurs by using image processing technology of the sensing unit 120 or the controller 190.

The dart game apparatus 100 may store both the moving pictures recorded by the first and second cameras 151 and 152 by using one region of the memory 180 or a buffer configured by a separate memory.

The controller 190 may selectively extract moving pictures corresponding to time intervals T1, T2, and T3 including the moments E1, E2, and E3 when the dart game motion occurs from the buffer and store the extracted moving pictures in the memory 180. The time intervals T1, T2, and T3 may be configured similarly to or differently from the moving pictures recorded by the first and second cameras 151 and 152.

For example, the controller 190 may store in the memory 180 moving pictures recorded for 1 second before the game motion occurs and for 3 seconds after the game motion occurs with respect to the moving pictures recorded by the first and second cameras 151 and 152. On the contrary, the controller 190 may store in the memory 180 the moving pictures recorded for 1 second before the game motion occurs and for 3 seconds after the game motion occurs with respect to the moving pictures recorded by the first camera 151 and store in the memory 180 the moving pictures recorded for 3 seconds before the game motion occurs and for 1 second after the game motion occurs with respect to the moving pictures recorded by the second camera 152.

The controller 190 may store in the memory 180 moving pictures recorded during time intervals not including the game motion occurrence moments E1, 32, and E3 with respect to a moving picture recorded by any one of the first and second cameras 151 and 152.

For example, the controller 190 may store in the memory 180 moving pictures recorded during a time interval from 3 seconds after the game motion occurs to 6 seconds after the game motion occurs with respect to the moving pictures recorded by the second camera 152.

Hereinafter, an embodiment in which a moving picture including a score of a game motion is generated and stored will be described in detail with reference to the drawings.

FIG. 5 is a diagram illustrating a stored moving picture including the score of the game motion.

In yet another embodiment of the present invention, the controller 190 may calculate the score by evaluating the game motion for the dart target 110 and generate a moving picture in which the calculated score is displayed in at least a part and store the generated moving picture in the memory 180.

As illustrated in FIG. 5, for example, in the case of the dart game, the controller 190 may evaluate the score for the game motion. For example, when the dart hits a region corresponding to 19 points in the dart target 110, the game motion may be evaluated as 19 points.

The controller 190 may generate a moving picture in which the evaluated score S is displayed in one region of a screen by using the moving picture stored in the memory 180. The score S may be deployed at an edge of the screen or displayed in a semi-transparent form so as not to be displayed to overlap with a main scene of the game motion.

Hereinafter, an embodiment of performing primary authentication of the game motion through the user authentication unit will be described in detail with reference to the drawings.

FIG. 6 is a diagram illustrating a game moving picture of which primary authentication is completed.

FIG. 7 is a diagram illustrating a webpage displaying a dart game result of which primary authentication is completed.

In still another embodiment of the present invention, after the game motion occurs, unique information of another game player which does not perform the game motion may be received by the user authentication unit 170. In this case, the controller 190 processes that the moving picture including the game motion is primarily authenticated.

When a third person positioned in the same place as the game player verifies the play of the game player with eyes and evaluates the verified play as the righteous play, the third person may input unique information thereof through the user authentication unit 170. In this case, the controller 180 may determine the game data as game data having comparatively high reliability and determine that the game data is primarily authenticated.

The controller 190 may display the primarily authenticated moving picture differently from other moving pictures at the time of generating the moving picture for authenticating the game play.

As illustrated in FIG. 6, the controller 190 may generate a moving picture displaying that the primarily authenticated moving picture is primarily authenticated and store the generated moving picture in the memory 180.

The servers GS, DS, RS, and MS may manage the primarily authenticated game data differently from other game data.

As illustrated in FIG. 7, the dart game player may read game data thereof or of other game players through the web server WS. The dart game player may read game moving pictures of other game players through the web server WS and authenticate whether the game data of other game players are established by irregular play.

The web server WS may authenticate game data (data authenticated by a predetermined number of persons or more and data authenticated by users (e.g., referees) having an authority granted by the server) that satisfies a predetermined criterion as authenticated official game data. The web server WS may separately manage the office game data.

When the user selects an icon $I_1$, the web server WS may provide a webpage displaying a ranking and game data including both preauthenticated game data and unauthenticated game data.

When the user selects an icon $I_2$, the web server WS may provide a webpage displaying a ranking and game data considering only the preauthenticated game data. The web server WS may provide a webpage including an icon $I_3$ displaying primarily authenticated game data.

According to yet another embodiment of the present invention, the controller 190 may schedule a transmission time of the moving picture according to a state of the network connected with the game apparatus 100. The network connection unit 160 may transmit the moving pictures stored in the memory 180 according to the scheduling. In this case, the controller 190 may schedule the transmission time of the moving picture by considering at least one of traffic amount of the network, whether the network is accessible, or an accessible time.

Hereinafter, a game data authenticating method of the game apparatus according to an embodiment of the present invention will be described in detail with reference to the drawings.

FIG. 8 is a flowchart illustrating a dart game data authenticating method of the game apparatus according to the embodiment of the present invention.

The dart game apparatus 110 records at least a part of the game player and at least a part of the dart target. The dart game apparatus 110 stores at least some of the recorded moving pictures (S120). The camera may be deployed to record the throw line in the dart game or in such a manner that the multiple cameras have a common recording area.

In storing at least some of the recorded moving pictures, the dart game apparatus 100 may temporarily store all of the recorded moving pictures in the buffer (S121). The dart game apparatus 110 may selectively store moving pictures recorded during a time interval including a time when the dart game motion occurs among the moving pictures temporarily stored in the buffer, in the memory (S122).

The dart game apparatus 100 may calculate the score by evaluating the game motion of the game player (S123) and the dart game apparatus 100 may generate a moving picture in which the evaluated score is displayed on at least a part of the screen (S124).

When the dart game motion associated with the generation of the moving picture is performed and thereafter, unique information of the third person is received through the user authentication unit 170, the dart game apparatus may process a moving picture corresponding thereto to be primarily authenticated.

A primary authentication work may be repeatedly performed every game motion or after the game ends at once, the primary authentication work may be performed all at once with respect to one-time game.

When the unique information of the third person is not received through the user authentication unit 170, the game apparatus 100 performs a next step (S140) without the primary authentication work.

The game apparatus 100 may schedule the moving picture transmission time (S140) and transmit the moving picture to the server through the network according to the scheduled result (S150).

FIG. 15 illustrates a flowchart of a dart game recording method for recording a moving picture of a part during a dart game by a dart game apparatus according to an embodiment of the present invention.

First, it may be sensed that the dart game player is ready for throwing the dart. The sensing may be achieved when the dart game player touches the touch unit 195. Next, the dart game may be recorded from the time when the dart game player is ready for throwing the dart (1502). Next, it may be sensed that the dart contacts the dart target (1503). The sensing may be achieved as the sensing unit 120 senses that the dart contacts the dart target. Next, recording may be performed up to the time when the dart contacts the dart target (1504). Further, in the recording, at least a part of the dart game player and at least a part of the dart target may be recorded. Last, at least some of the recorded moving pictures may be stored or transmitted to the network (1505).

FIG. 16 illustrates a flowchart of a dart game recording and editing method for editing a part of a moving picture acquired by recording a dart game by a dart game apparatus according to another embodiment of the present invention.

First, the dart game may be recorded (1601). The recording may be performed by the camera unit 150. Next, the recorded moving picture may be temporarily stored (1602). The recorded moving picture may be temporarily stored in the memory 180 or a separate buffer unit. Next, it may be sensed that the dart contacts the dart target (1603). The sensing may be achieved as the sensing unit 120 senses that the dart contacts the dart target. Next, it is possible to edit a moving picture within a predetermined time from the time when the dart contacts among the stored moving pictures when it is sensed that the dart contacts the dart target. The editing may be achieved by the controller 190. Last, the edited moving picture may be stored in the memory or transmitted to the network (1605).

According to yet another embodiment of the present invention, a method for storing some moving pictures during the dart game in the dart game apparatus is disclosed.

FIG. 17 illustrates a flowchart of a method for storing a partial moving picture of a moving picture acquired by recording a dart game by a dart game apparatus according to yet another embodiment of the present invention.

Referring to FIG. 17, first, the camera may record the dart game (1701). Next, the moving picture data acquired by recording the dart game may be temporarily stored in the memory buffer unit (1702). Next, the sensing unit may sense that the dart contacts the dart target (1703). Last, when the sensing unit senses that the dart contacts the dart target, the controller may store in the memory unit the moving picture data within a predetermined time based on the moment when the dart contacts from the memory buffer unit (1704).

Herein, the predetermined time based on the time when the dart contacts may be a predetermined time before and after the dart contacts the dart target or a part thereof.

It will be appreciated by those skilled in the art that information and signals may be expressed by using various different predetermined technologies and techniques. For example, data, instructions, commands, information, signals, bits, symbols, chips which may be referred to in the above description may be expressed by voltage, current, electromagnetic waves, magnetic fields, or particles, optical fields or particles, or predetermined combinations thereof.

Those skilled in the art of the present invention will appreciate that various exemplary logic blocks, modules, processors, means, circuits, and algorithm steps can be implemented by electronic hardware, various types of programs or design codes (designated as "software" herein for easy description), or a combination thereof described in association with the embodiments disclosed herein. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present invention may implement functions described by various methods with respect to each specific application, but it should not be analyzed that the implementation determination departs from the scope of the present invention.

Various exemplary logic blocks, modules, circuits described in association with the embodiments disclosed herein may be implemented or performed by a general processor, a digital signal processor (DSP), an application specific integrated circuit (ASIC), a field programmable gate array (FPGA) or another programmable logic device, discrete gate or transistor logic, discrete hardware components, or predetermined combinations thereof. The general processor may be a microprocessor and alternatively, the general processor may be a predetermined existing processor, controller, microcontroller, or state machine. The processor may also be implemented as combinations of computing devices, for example, a combination of the DSP and the microprocessor, multiple microprocessors, one or more microprocessors connected with a DSP core, or predetermined other components.

It will be appreciated that a specific order or a hierarchical structure of steps in the presented processes is one example of exemplary accesses. It will be appreciated that the specific order or the hierarchical structure of the steps in the processes within the scope of the present invention may be rearranged based on design priorities. Appended method claims provide elements of various steps in a sample order, but it does not mean that the method claims are limited to the presented specific order or hierarchical structure.

Steps of a method or an algorithm described in association with the embodiments disclosed in the specification may be directly implemented by hardware, a software module which is executed by a processor or a combination thereof. The software module (including, for example, executable commands and related data) and other data may reside in a RAM memory, a flash memory, a ROM memory, an EPROM memory, an EEPROM memory, registers, a hard disk, a movable disk, a CD-ROM, or a data memory (for example, a computer-readable medium) such as another predetermined type storage medium which is technologically known. The exemplary storage medium may be connected to a machine such as the computer or the processor (may be designated as the "processor", for convenience), and as a result, the processor may read information (for example, software commands from the storage medium and record information in the storage medium. The exemplary storage media may be integrated with the processor. The processor and the storage medium may reside in an application specific integrated circuit (ASIC). The ASIC may reside in a user device. Alternatively, the processor and the storage medium may be included in the user device as individual components.

In one or more exemplary designs, described technologies may be implemented by hardware, software, firmware, or predetermined combinations thereof. If the technologies are implemented, functions may be stored in the computer-readable medium, transmitted as one or more indications through the computer-readable medium, or coded in the computer-readable medium. The computer-readable medium includes both a computer storage medium and a communication medium including predetermined media that facilitate transmission of a computer program from one location to another location. The storage medium may be a predetermined usable medium which may be accessed by a general or special-purpose computer. As an example, the present invention is not limited and the computer-readable medium may be accessed by the RAM, the ROM, the EEPROM, the CD-ROM, or another optical disk storage, a magnetic field disk storage, or other magnetic field storage devices, the general or special-purpose computer, or a general or special-purpose processor and may include another predetermined medium which may be used to transport or store program code means required in the form of the indications or data structures. Further, all connections approximately come to a close as the computer-readable medium. For example, if the software is transmitted from a website, the server, or another remote source by using a coaxial cable, an optical fiber cable, a twist pair, a digital subscriber line (DSL), or wireless technologies such as infrared rays, wireless, and a microwave, the coaxial cable, the optical fiber cable, the twist pair, the digital subscriber line (DSL), or the wireless technologies such as the infrared rays, the wireless, and the microwave are included in a definition of the medium. As used herein, a disk and a disc includes a compact disk (CD), a laser disk, an optical disk, a DVD, a floppy disk, a blu-ray disk and herein, the discs optically reproduces data with a laser, while the disks generally magnetically reproduce data. Combinations of the aforementioned components will also be included in the range of the computer-readable medium.

The description of the presented embodiments is provided so that those skilled in the art of the present invention use or implement the present invention. It will be apparent to those skilled in the art that various modifications of the embodiments will be apparent to those skilled in the art and general principles defined herein can be applied to other embodiments without departing from the scope of the present invention. Therefore, the present invention is not limited to the embodiments presented herein, but should be analyzed within the widest range which is associated with the principles and new features presented herein.

The invention claimed is:

1. A dart game apparatus for storing a part of a moving picture acquired by recording a dart game, the apparatus comprising:
   a camera unit for recording the dart game;
   a buffer unit for temporarily storing moving pictures recorded by the camera unit;
   a sensing unit for sensing that a dart contacts a dart target;
   a controller for generating a part of the moving pictures that comprises the moment that the dart contacts the dart target among the moving pictures stored in the buffer unit by editing the moving pictures when the sensing unit senses that the dart contacts the dart target, and storing the part of the moving pictures; and
   a touch unit for sensing that the dart game player is ready for throwing the dart,
   wherein the part of the moving pictures comprises a predetermined time interval from and after the moment that the dart contacts the dart target, and further comprises the time interval from the time when the touch unit senses that the dart game player is ready for throwing the dart up to the time when the dart contacts the dart target, wherein the time when the touch unit senses that the dart game player is ready for throwing the dart is the time the dart game player steps on the touch unit that is installed in the ground.

2. The apparatus of claim 1, further comprising:
a network connection unit for transmitting the part of the moving pictures to a network.

3. The apparatus of claim 1, further comprising:
a memory unit for storing the part of the moving pictures.

4. The apparatus of claim 1, wherein the part of the moving pictures comprises a predetermined time interval before the moment that the dart contacts the dart target and a predetermined time interval after the moment that the dart contacts the dart target.

5. The apparatus of claim 1, wherein when the dart hits a predetermined region of the dart target, at least one corresponding region of the dart target of another dart game device is deactivated.

6. A non-transitory computer-readable recording medium including a program code allowing at least one computer to store a part of moving pictures during a dart game by a dart game apparatus, the recording medium comprising:

a program code for allowing a camera unit to record a dart game;

a program code for allowing a buffer unit to temporarily store moving pictures recorded by the camera unit;

a program code for allowing a sensing unit to sense that a dart contacts a dart target;

a program code for allowing a controller to generate a part of the moving pictures comprising the moment that the dart contacts the dart target among the moving pictures stored in the buffer unit by editing the moving pictures when the sensing unit senses that the dart contacts the dart target, and store the part of the moving pictures; and a program code for allowing a touch unit to sense that the dart game player is ready for throwing the dart, wherein the part of the moving pictures further comprises a predetermined time interval from and after the moment that the dart contacts the dart target, and further comprises the time interval from the time when the touch unit senses that the dart game player is ready for throwing the dart up to the time when the dart contacts the dart target, wherein the time when the touch unit senses that the dart game player is ready for throwing the dart is the time the dart game player steps on the touch unit that is installed in the ground.

\* \* \* \* \*